Patented Nov. 30, 1937

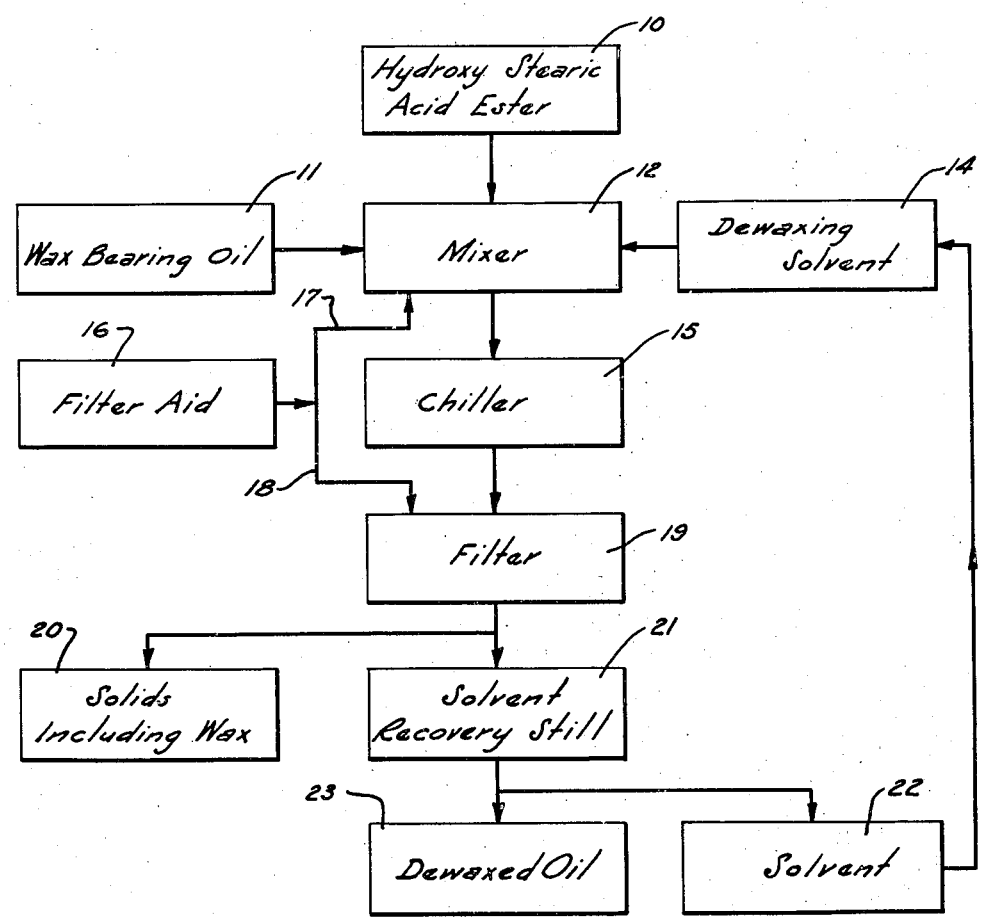

2,100,916

UNITED STATES PATENT OFFICE 2,100,916

REMOVAL OF WAX FROM HYDROCARBON OIL

Ernest F. Pevere and Clifford G. Ludeman, Beacon, N. Y., assignors to The Texas Company, New York, N. Y., a corporation of Delaware Application November 21, 1935, Serial No. 50,813

9 Claims. (Cl. 196—19)

This invention relates to the dewaxing of wax-bearing oil, and particularly to the separation of wax from a mineral lubricating oil.

The invention contemplates the separation of wax from such a wax-bearing oil by the employment of an esterified hydroxy stearic acid as a wax crystal modifying material, to facilitate dewaxing by centrifuging, cold settling or filtration. In accordance with the present invention, the wax crystal modifying material is added to a wax-bearing oil, and the oil then chilled with resulting precipitation of wax in a form which is found to facilitate separation by centrifuging or cold settling, and which is also found to materially increase the filtering rates where the wax is separated by filtration.

We have discovered that the esterification product of an hydroxy stearic acid with a fatty acid constitutes effective material for purposes of the present invention. The hydroxy stearic acid may be esterified with a higher fatty acid, such as stearic, palmitic and the like. An example of such products comprises the material obtained by esterifying dihydroxy stearic acid with stearic acid. These esterified products are preferably added to a wax-bearing oil in the proportion of about 0.5% to about 5.0% or more by weight.

As a specific example of the present invention, the product obtained by esterifying dihydroxy stearic acid with stearic acid is described. The dihydroxy stearic acid may be conveniently obtained by oxidation of oleic acid. For example, a water solution of 84 g. of oleic acid in 1500 cc. of water, to which was added 33 g. of potassium hydroxide, was cooled to around 0° C.; and then a previously prepared solution containing 84 g. of potassium permanganate dissolved in 1500 cc. of water was added slowly with agitation, such that the temperature did not rise above 10° C. The mixture was stirred for an hour after the solution had been added, and then was allowed to stand for a period of time. The precipitate of manganese dioxide was filtered off and the solution acidified with dilute sulphuric acid, which caused the precipitation of the dihydroxy stearic acid. This was filtered, dried, extracted with ether and again dried.

20 g. of the dihydroxy stearic acid was then heated with 16.8 g. of commercial stearic acid to a temperature of around 240° C. while under high vacuum equivalent to about 20 mm. Hg. The temperature was maintained at 240° C. for 2 hours. The product was then found to contain about 5% free fatty acid (figured as stearic acid). It was again heated to 240° C. and maintained at this temperature for an hour, at which time the free fatty acid content had dropped to 3%. After cooling, the reaction product was dissolved in about 300 cc. of diethyl ether, filtered, and the filtered ethereal solution washed first with sodium carbonate solution and then with distilled water. The ether was then evaporated and the product heated at 100° C. for 1 day, and then cooled over calcium chloride.

The substance so obtained is a light amber colored jelly and apparently is a complex mixture of compounds. A part of the material dissolves quite readily in mineral oil, but part is difficultly soluble or insoluble. The material precipitates out upon chilling of the wax-bearing oil at a temperature range which is substantially coextensive with the temperature range of precipitation of the wax, and is found to alter wax crystal formation such as to materially improve wax separation.

As further examples of materials of the present invention, ricinoleic acid may be oxidized to trihydroxy stearic acid in the manner set forth above in connection with the oxidation of oleic acid to dihydroxy stearic acid. The trihydroxy stearic acid may then be esterified with stearic acid, or with palmitic acid, or with a mixture of stearic and palmitic acids, to produce a resinous reaction product. In a similar manner, linoleic acid may be oxidized to tetrahydroxy stearic acid, and this material esterified with stearic acid, or palmitic acid, or a mixture of stearic and palmitic acids, to produce a resinous material. The monohydroxy stearic acid may also be esterified with a higher fatty acid to produce a satisfactory material for purposes of the present invention.

The esterified products described above are preferably employed in conjunction with a dewaxing solvent or solvent mixture. Very satisfactory results are secured by the use of a mixture of a wax solvent with a non-solvent, such as a mixture of benzol and acetone, for instance, in the proportion of 65% benzol and 35% acetone. Another very satisfactory solvent mixture of this character, particularly for use in the dewaxing of residual oils, consists of 28-35% acetone, 47-50% benzol and 15-18% toluol. Similar mixtures of methyl ethyl ketone and benzol, or methyl ethyl ketone, benzol and toluol, may likewise be employed. Other well known dewaxing solvents or solvent mixtures can be used, such as propane, ethylene dichloride, ethylene dichloride and benzol, mixtures of ketones or aliphatic alcohols with hydrocarbons such as naphtha, pentane, propane, benzol, etc. and the like. A comminuted filter aid material of the character of infusorial or diatomaceous earth may also be employed in conjunction with the wax crystal modifying material, and also with the solvent or solvent mixture. The filter aid material may be added prior to, during or after chilling.

By way of example, the invention is particularly described and illustrated in the accompanying drawing, in which the single figure is a flow sheet of the method. The wax crystal modifying material, in this case an hydroxy stearic acid ester, is added from tank 10 to a wax-bearing oil from storage 11 in a suitable mixer or agitator 12. Proportions in which the modifying material can be added to the wax-bearing oil, vary within substantial limits; but from the standpoint of economy it is preferred to add about 0.5 to 5.0% by weight, depending upon the character of oil being treated. The ester may be added directly to the lubricating oil; or a solution of the ester may be first prepared in a suitable solvent, such as a lubricating oil or a dewaxing solvent, and the solution added to the wax-bearing oil to give the desired proportion of ester in the mixture.

A dewaxing solvent from storage tank 14 is preferably added to the wax-bearing oil. By way of example, a solvent mixture of 35% acetone and 65% benzol in the proportion of one part of oil to three parts of solvent is herein described.

The wax-bearing oil mixture is then passed through chilling coils 15 where it is chilled to a temperature around 0° F. to −20° F. or lower. A filter aid material from the hopper feed 16 may be supplied by line 17 to the agitator 12, so that the oil is chilled in the presence of a filter aid material. Or, the filter aid material can be supplied by line 18 to the already chilled oil as the latter is fed to a filter 19. Or, a proportion of filter aid can be added both before and after chilling. The filter 19 may be of any suitable conventional construction, such for example as a pressure filter or a continuous filter. The solids including wax are removed by the filter and passed to receiving tank 20, while the filtrate of dewaxed oil and solvent passes to a solvent recovery still 21. Here the solvent is distilled from the dewaxed oil and passed to a receiving tank 22, from where it may be returned to the storage tank 14 for reuse in the process. The dewaxed oil is passed to tankage 23.

Where a solvent mixture of the character of acetone-benzol or acetone-benzol-toluol is employed, the resulting wax-free oil is found to have a pour test around 0° F. when chilled only to 0° F. or slightly below. The filtering rates of the chilled oil may be improved as much as 100 to 150% or more over those obtained when the same chilled mixture omitting the wax crystal modifying material, is employed.

Obviously many modifications and variations of the invention, as hereinbefore set forth, may be made without departing from the spirit and scope thereof, and therefore only such limitations should be imposed as are indicated in the appended claims.

We claim:

1. The method in the dewaxing of a wax-bearing mineral oil, which comprises mixing with the oil an esterified hydroxy stearic acid which has the property of modifying wax crystal formation upon chilling of the oil in the presence thereof, chilling the mixture to precipitate the wax, and separating the wax from the oil.

2. The method of claim 1, in which the wax crystal modifying material is a product prepared by esterifying a polyhydroxy stearic acid with a fatty acid.

3. The method of claim 1, in which the wax crystal modifying material is a product prepared by esterifying an hydroxy stearic acid with a higher saturated fatty acid.

4. The method of claim 1, in which the wax crystal modifying material is a product prepared by esterifying an hydroxy stearic acid with stearic acid.

5. The method of claim 1, in which the wax crystal modifying material is a product prepared by esterifying dihydroxy stearic acid with stearic acid.

6. The method of claim 1, in which the wax is separated from the oil by filtration, and in which the esterified product serves to materially increase the filtration rate.

7. The method of claim 1, in which a dewaxing solvent is also added to the wax-bearing oil prior to wax separation.

8. The method of claim 1, in which a dewaxing solvent comprising acetone and benzol is added to the wax-bearing oil prior to wax separation.

9. The method of claim 1, in which a filter-aid material is added to the wax-bearing oil prior to wax separation.

ERNEST F. PEVERE.
CLIFFORD G. LUDEMAN.